US012644309B2

(12) United States Patent
Bernard

(10) Patent No.: US 12,644,309 B2
(45) Date of Patent: Jun. 2, 2026

(54) LOCKING SYSTEM FOR A DOOR OF A COMPARTMENT OF A PARCEL LOCKER BANK

(71) Applicant: QUADIENT TECHNOLOGIES FRANCE, Bagneux (FR)

(72) Inventor: Emmanuel Bernard, Sannois (FR)

(73) Assignee: QUADIENT TECHNOLOGIES FRANCE, Bagneux (FR)

( * ) Notice: Subject to any disclaimer, the term of this patent is extended or adjusted under 35 U.S.C. 154(b) by 4 days.

(21) Appl. No.: 18/969,624

(22) Filed: Dec. 5, 2024

(65) Prior Publication Data

US 2025/0179835 A1 Jun. 5, 2025

(30) Foreign Application Priority Data

Dec. 5, 2023 (EP) .................................... 23307138

(51) Int. Cl.
*E05B 47/00* (2006.01)

(52) U.S. Cl.
CPC .. *E05B 47/0001* (2013.01); *E05B 2047/0037* (2013.01)

(58) Field of Classification Search
CPC ............... E05C 2005/005; E05C 19/14; E05B 47/0001; E05B 2047/0037; E05B 17/0037;

(Continued)

(56) References Cited

U.S. PATENT DOCUMENTS 509,116 A * 11/1893 Callahan ............. E05B 47/0001 49/31
2,937,541 A * 5/1960 Barlow ..................... E05C 3/24 244/102 R (Continued)

FOREIGN PATENT DOCUMENTS

DE 1 158 403 B 11/1963
EP 2 992 153 3/2016

(Continued)

OTHER PUBLICATIONS

Extended European Search Report for EP 23307138.0, dated May 10, 2024, 5 pages.

*Primary Examiner* — Christine M Mills
*Assistant Examiner* — Faria F Ahmad
(74) *Attorney, Agent, or Firm* — Cozen O'Connor

(57) ABSTRACT

A locking system for a door of a compartment of a parcel locker bank to automatically open a door in response to a control signal, includes a locking element mounted onto a door and a latch mounted to a wall, the locking element including a protruding portion extending in a first direction perpendicularly to the door, the latch comprising a latch pivot around which the latch rotates between a locking position and an unlocking position, the latch pivot having an axis of rotation extending along a second direction perpendicular to the first direction. The latch includes a slider and a guiding rail to guide the slider along a translation direction, the translation parallel to a third direction perpendicular to both the first direction and the second direction when the latch is in the locking position and different from the third direction when the latch is in the unlocking position.

16 Claims, 5 Drawing Sheets

(58) Field of Classification Search
CPC ............... E05B 15/102; E05B 17/2042; E05B 47/0004; E05B 47/0607
See application file for complete search history.

(56) References Cited

U.S. PATENT DOCUMENTS

| | | | | | |
|---|---|---|---|---|---|
| 2,994,934 | A * | 8/1961 | Kraus | E05C 19/14 | 24/271 |
| 3,214,948 | A * | 11/1965 | Modrey | E05B 63/127 | 70/99 |
| 3,667,793 | A * | 6/1972 | Varrin et al. | E05C 3/24 | 292/216 |
| 3,751,088 | A * | 8/1973 | Schlage | E05B 47/0607 | 292/201 |
| 5,931,033 | A * | 8/1999 | Lanigan | E05C 3/06 | 70/451 |
| 6,554,326 | B1 * | 4/2003 | Goldman | E05B 47/0002 | 292/201 |
| 6,641,183 | B2 * | 11/2003 | Brown | E05B 65/1013 | 70/92 |
| 7,603,882 | B2 * | 10/2009 | Carbajal | E05B 47/0002 | 292/201 |
| 8,328,299 | B2 * | 12/2012 | Hashemi | A47B 88/463 | 312/333 |
| 8,720,959 | B2 * | 5/2014 | Wittke | E05B 47/0047 | 292/201 |
| 10,591,201 | B2 * | 3/2020 | Denison | F25D 23/028 | |
| 10,794,087 | B2 * | 10/2020 | Teunis | E05B 47/0002 | |
| 11,346,129 | B1 * | 5/2022 | Weinerman | E05B 59/00 | |
| 2009/0235767 | A1 * | 9/2009 | Garneau | E05B 47/0012 | 292/201 |
| 2010/0139338 | A1 * | 6/2010 | Wintersteiger | E05B 47/0004 | 70/264 |
| 2011/0163556 | A1 * | 7/2011 | Scheffler | E05B 47/0002 | 292/337 |
| 2014/0202220 | A1 * | 7/2014 | Denison | E05B 47/0603 | 70/266 |
| 2018/0000312 | A1 * | 1/2018 | Dirnberger | E05C 19/02 | |
| 2018/0163433 | A1 * | 6/2018 | Schmidt | A47L 15/4259 | |
| 2021/0180238 | A1 * | 6/2021 | Bicic | D06F 49/003 | |
| 2022/0349225 | A1 | 11/2022 | Yeh et al. | | |
| 2026/0002726 | A1 * | 1/2026 | Denison | F25D 23/028 | |

FOREIGN PATENT DOCUMENTS

| | | | |
|---|---|---|---|
| EP | 3 306 577 | A1 | 4/2018 |
| WO | 2014176619 | A1 | 11/2014 |

* cited by examiner

LOCKING SYSTEM FOR A DOOR OF A COMPARTMENT OF A PARCEL LOCKER BANK

FIELD OF THE INVENTION

The present invention relates to an electrical lock, which can be released in an automated manner, and which can be used especially for parcel locker banks.

PRIOR ART-BACKGROUND OF THE INVENTION

Parcel locker banks are used for dispatching, storing and picking up various kinds of shipments such as parcels or packages. A parcel locker bank comprises a series of compartments with different sizes, which are equipped with electrically controlled doors. These parcel locker bank systems are typically used by carrier agents for dropping off parcels, which are then picked-up from the parcel locker bank by recipients. Usually, a parcel locker bank includes a central processor operating the doors of the different compartments as described in EP3306577. The door of each compartment can be securely maintained closed by a latch in a locking position. Typically, the latch is blocked in the locking position with the door closed, preventing access to the compartment. When a user is authorized access to the compartment, for example for a carrier agent dropping off a parcel or for a recipient picking up a parcel, an electric control signal releases the latch, i.e. places the latch in an unlocking position so the door is opened automatically. After having accessed the compartment, the authorized user pushes the door back to its closed position, for example after a carrier agent has dropped off a parcel or after a recipient has picked up a parcel. Closing of the door results in the latch being repositioned and blocked in the locking position, thus keeping the door closed.

Thus, the compartment of a parcel locker bank has two normal states: a secured state within which the door is closed and the latch is in the locking position, and an access state within which the door is opened and the latch is in the unlocking position.

However, it can happen sometimes, between the moment a door of a compartment is opened and the moment it is closed back, that the latch is repositioned and blocked in the locking position before the door is completely closed. This can happen due to a mishandling or a malicious action. Such a set of events would simulate the action of closing of the door but without the door being really closed and locked in. The door would then still be opened, and the latch would be blocked in its locking position.

This would correspond to an abnormal state in which the door is opened and the latch is in the locking position. In such an abnormal state, it is impossible to close and lock the door anymore.

To detect this abnormal state, two separate sensors are usually required: one sensor detecting whether the door is closed or opened, and one sensor detecting whether the latch is in its locking position or in its unlocking position. Correcting this abnormal state requires a monitoring of both separate sensors and, based on the detection of the abnormal state, an action with an electric control signal to release the latch in an unlocking position.

A new locking system which can still be operated in such an abnormal state with the door opened and the latch in the locking position would help avoiding using these two sensors and thus help reducing the costs.

OBJECT AND DEFINITION OF THE INVENTION

It is an object of the present invention to at least substantially overcome or improve at least one or more of the disadvantages described above.

Disclosed are arrangements, which seek to provide a new locking system for a door of a compartment of a parcel locker bank designed for automatically opening a door to which the door lock device is coupled in response to an electric control signal, the new locking system being designed so it can still be closed even when the latch is already in its locking position while the door is not yet closed.

The object of the invention consists therefore in a locking system for a door of a compartment of a parcel locker bank designed for automatically opening a door to which the door lock device is coupled in response to an electric control signal. The locking system includes a locking element and a latch, the locking element being designed to be mounted to a door of a compartment while the latch is designed to be mounted to a wall of said compartment. The locking element includes a protruding portion extending in a first direction. The first direction is intended to be perpendicularly to the door when the locking system is coupled with a door and the door of the compartment is in a closed position. The latch includes a latch pivot around which the latch rotates between a locking position in which the latch can lock onto the protruding portion of the locking element when the latch and the locking element are in contact together and an unlocking position in which the protruding portion is released from the latch to open the door, the latch pivot having an axis of rotation extending along a second direction perpendicular to the first direction.

According to a general feature of the invention, the latch further comprises a slider and a guiding rail configured to guide the slider along a translation direction, said translation being parallel to a third direction perpendicular to both the first direction and the second direction when the latch is in the locking position and different from the third direction when the latch is in the unlocking position.

This design of the locking system according to the invention allows closing and locking the door even when the locking system is in an abnormal state such as when the latch is in a locking position before the door has been completely closed.

A locking system with such a design prevents the need for two separate sensors, which would be required for detecting and correcting the abnormal state. Indeed, as the abnormal state does not prevent the door from being closed and locked, there is no longer any need to monitor the position of the locking system.

In a preferred embodiment, the protruding portion of the locking element can comprise an aperture passing through the protruding portion along the third direction, and the slider can comprise, along the translation direction, a first end facing the protruding portion when the latch is in contact with the locking element, a second end opposite the first end, and a tooth extending outwardly from said first end along the translation direction, the tooth being shaped to engage with the protruding portion and remain into said aperture when the latch is in the locking position.

Advantageously, the tooth can comprise a contacting surface facing towards the locking element and forming an angle between 30° and 60° and preferably 45° with the translation direction.

The orientation of the contacting surface facilitates a transfer of a pushing force of the protruding portion of the locking element into a substantially perpendicular sliding force allowing for the slider to slide along the guiding rail.

Advantageously, the protruding portion of the locking element can comprise, along the first direction, a front end facing the contacting surface of the tooth, the front end having substantially a cylindrical surface extending along the second direction with a base being substantially triangular or substantially semi-circular.

Such a front end improves the ease with which the pushing force of the locking element is transformed into a substantially perpendicular sliding force, allowing the slider to slide along the guiding rail.

Advantageously, the latch can comprise a latch leg always crossing the direction along which the protruding portion extends whatever position the latch is in, said protruding portion being configured to push onto the latch leg.

The latch leg is typically pushed by the locking element when the door is being pushed closed. The protruding portion can also push together onto the latch leg and a pushing rod.

In a preferred embodiment, the latch leg can be a protrusion of the slider extending from its first end.

Advantageously, the locking system can further include a torsion spring with a first leg configured to push the slider towards the locking element and hold it engaged with the locking element when the latch is in the locking position, and to rotate and maintain the latch into the unlocking position otherwise, for example when the latch is released from the locking position and automatically returns to the unlocking position.

The locking position of the latch corresponds to an engaged position of the slider in which the slider is pushed downwards relatively to the guiding rail.

The torsion spring continuously advantageously pushes onto the slider and therefore ensures that the slider is maintained in the engaged position and also, as a second function, ensures that the latch, once unlocked, remains in the unlocking position as long as the door is not closed. A particular interesting aspect of the invention is that the torsion spring, in addition to maintaining the slider in the engaged position, allows the locking system to return from an abnormal state with the door opened and the latch in the locking position to a normal state with the door opened and the latch in the unlocking position. In other words, the torsion spring provides both a function for sliding the slider into the engaged position and maintaining the slider in the engaged position, and a function for rotating the latch from the locking position to the unlocking position and maintaining the latch in the unlocking position.

The torsion spring can be a helical torsion spring.

The locking system can further comprise a support and a mechanical stop fixed onto the support, and the torsion spring can comprise a spring axle fixed on said support and a second leg blocked by the mechanical stop thereby preventing the torsion spring from rotating around the spring axle.

The torsion spring can be configured to remain continuously in tension between the slider and the mechanical stop thereby continuously pushing onto the slider.

The latch can comprise a maintaining element mounted on the latch pivot and configured to hold the slider in sliding contact with the guiding rail.

Preferably, the slider comprises a first slot extending along the translation direction and through which the latch pivot extends, thus limiting the translation movement of the slider relatively to the guiding rail.

Advantageously, the slider can include a spring stopper extending from the slider in a direction parallel to the second direction, the first leg of the torsion spring pushing constantly against the spring stopper at least partially along the third direction to hold the slider down when the latch is in the locking position.

The spring stopper is preferably configured to maintain the slider in the engaged position, and preferably with a circular cylindrical shape.

A most beneficial advantage of the locking system according to the invention is that the torsion spring provides both a function for sliding the slider into the engaged position and maintaining the slider in the engaged position and a function for rotating the latch from the locking position to the unlocking position and maintaining the latch in the unlocking position. In such preferred embodiment, when the latch is in the locking position and the slider is pushed back up by the protruding portion being pushed towards the latch, the first leg of the torsion spring forms a first angle (A1) with the third direction which is larger than or equal to 45 degrees so as for sliding frictions of the slider to be overcome. The direction of the translation of the slider corresponds to the direction of a translation force T resulting from a pushing of the torsion spring and exerted onto the slider.

Preferably, the tooth has a tooth height h between 3 and 5 millimeters measured along the third direction when the latch is in the locking position to ensure safely securing the latch in the locking position and thus hold the door closed and locked. The tooth height corresponds to the slider translation from the engaged position to the disengaged position when the spring stopper slides within the slotted hole.

The tooth height h is equal to 3.5 millimetres.

Preferably, an axis of the latch pivot and the spring axis of the torsion spring are separated, along the first direction, by a distance d between 6 and 17 millimeters. The distance d is long enough for lowering the angle A1 between the direction of the translation of the slider and the axis of the first leg, therefore minimizing the sliding frictions of the slider and allowing the translation force T to overcome the sliding frictions.

In a preferred embodiment, the distance d is equal to 9.1 millimeters.

Preferably, the first leg of the torsion spring and the first direction form a second angle A2 which is larger than 20°, when the latch is in the locking position and the slider is in an engaged position corresponding to the slider pushed downwards relatively to the guiding rail in order to overcome rotation frictions of the latch. Lowering an angle between the axis of the first leg and the direction of the translation of the slider results in increasing a rotation force R applied by the torsion spring on the latch and in decreasing the rotation frictions, therefore facilitating the rotation of the latch.

In a preferred embodiment, the second angle A2 is equal to 24.8 degrees.

Preferably, a gap g corresponding to a distance between a zone of contact of the first leg with the spring stopper and a spring lower axis perpendicular to the direction of the translation of the slider and tangent to an outer part of the torsion spring near an origin of the first leg is between 3 and 7 millimeters so that the gap g is wide enough for increasing the rotation force R for overcoming the rotation frictions of the latch on the latch pivot.

In a preferred embodiment, the gap g is equal to 3.5 millimeters.

In a particular embodiment, an arrangement of the spring axle and the spring stopper is defined by an inequality between said distance d and said gap p, the inequality being $d \leq g/0.36$, allowing for a rotation force R to overcome the rotation frictions.

In another embodiment, an arrangement of the spring axle and the spring stopper is defined by an inequality between said distance d and said gap p, the inequality being $d \geq g+h$ where h corresponds to a measure of the tooth height, allowing for a translation force T to overcome the sliding frictions.

In another embodiment, an arrangement of the spring axle and the spring stopper is defined by a double inequality between said distance d and said gap p, the double inequality being $g+h \leq d \leq g/0.36$ where h corresponds to a measure of the tooth height h, which ensures an appropriate compromise for allowing the torsion spring to overcome the sliding frictions of the slider and the rotation frictions for rotating the latch.

Preferably, the protruding portion of the locking element comprises a holding shape configured to be penetrated by the latch to hold the door locked in the closed position.

Advantageously, along the second direction, the torsion spring can be on one side of the guiding rail while the slider is on the other side of the guiding rail, the spring stopper passing through the guiding rail, and the guiding rail comprising, along the translation direction, a first guiding end facing the locking element and a second guiding end opposite the first guiding end, the guiding rail further comprising a second slot extending along the translation direction and opening on the second guiding end of the guiding rail, the spring stopper being in sliding relation along the translation direction in the second slot.

Preferably, along the translation direction, the length of the second slot is longer or equal to a length of the first slot.

Advantageously, a section of the guiding rail along a cutting plane perpendicular to the translation direction has a flat U shape can include two opposite sides and a base extending between the two opposite sides, the slider having a translation movement parallel to the two opposite sides.

In a particular embodiment, the protruding portion can be a bar bent into a U shape.

Advantageously, the locking system can further comprise an actuator configured to move the retaining pawl from a retaining position, in which it blocks the latch in its locking position, to a releasing position in which it allows the latch to move into the unlocking position (i.e., letting the latch rotate into the unlocking position as the locking element is being released).

Advantageously, the locking system can further comprise a retaining pawl and a drive element, the retaining pawl comprising a pivot axle around which it rotates and being configured to block the latch in the locking position to prevent it from rotating and releasing the locking element, and the drive element being mechanically coupled to the retaining pawl and configured to rotate the retaining pawl around the pivot axle to reposition the retaining pawl from the retaining position to the releasing position.

The actuator can be an electromagnet.

The retaining pawl can be extended by a lever coupled to the drive element configured for pulling the retaining pawl and for rotating the retaining pawl around the pivot axle.

The locking system can also comprise spring means configured to continuously push the retaining pawl into the retaining position.

The spring means co-operate with the drive element and are configured to continuously push against the lever. Therefore, the retaining pawl is spring biased by the spring means, so that after momentarily activation of the actuator and the unlocking of the latch, the spring means constitutes a return spring for the lever and automatically returns the retaining pawl into the retaining position.

Advantageously, the locking system can further comprise a push rod configured to push against the protruding portion for the door to automatically open when the latch is moved from its locking position to its unlocking position, thus allowing closing and locking the compartment by simply pushing back the door in the closed position.

Advantageously, the locking system can further comprise a door sensor and a helical compression spring, said helical compression spring surrounding a part of the push rod and configured to push on a rod stop comprised in the push rod or attached to the push rod and extending substantially perpendicularly to a direction of a movement of the push rod, and said door sensor being activated by the rod stop when the push rod extends in an opened door position.

The door sensor can be an electrical limit switch configured to provide a first signal when the limit switch is activated by the rod stop and a second signal when the limit switch is not activated by the rod stop in particular when the push rod is pushed back into a closed door position once the door has been closed by an authorized user by pushing the door closed.

The invention also concerns a method closing and locking a door of a compartment of a parcel locker bank, said compartment being mounted with a locking system as defined above and thus comprising a locking element attached to said door and a latch attached to a wall of said compartment, the latch comprising a slider and a guiding rail. The method includes:

- a first act in which the door is opened and the latch in a locking position,
- a second act in which the door is pushed back by a user towards a closed position,
- a third act in which the slider is pushed up the guiding rail by the locking element from an engaged position towards a disengaged position, allowing the door to be closed although the latch was initially in a locking position with the door opened,
- a fourth act in which, once the door has been completely pushed back to a closed position, the slider gets back to and engaged position and locks in with the locking element to maintain door locked.

Preferably, in the fourth act, the slider is pushed back into the aperture of the locking element when the door reaches the closed position.

Preferably, the third act also includes compressing a torsion spring by a spring stopper as the locking element slips under the slider.

Advantageously, the method can also further comprise:

- pushing with the locking element onto a push rod (118), and compressing a helical compression spring (302) with a rod stop (304), de-activating a door sensor as the rod stop and the push rod are pushed back towards a closed door position, and providing a second signal when the door sensor is de-activated by the rod stop.

Advantageously, the guiding rail can guide the slider into a translation.

Further, the latch can rotate around a latch pivot having an axis substantially perpendicular to a direction of the translation.

The latch can be maintained in a locking position by a retaining pawl rotating around a pivot axle for releasing the latch from the locking position to an unlocking position.

The torsion spring continuously can push onto the spring stopper and maintain the slider in the engaged position as long as the door is not being closed.

The compressing a torsion spring can occur between a mechanical stop retaining a second leg of the torsion spring and the spring stopper attached to or part of the slider.

Pushing the slider can be performed by the torsion spring pushing on the spring stopper towards the locking element with a first leg of the torsion spring.

Maintaining the door in the closed position can be performed by the tooth engaged in the aperture and maintaining the locking element in the closed position while the push rod pushes against the locking element and the torsion spring continuously pushes onto the spring stopper and maintains the slider in the engaged position.

BRIEF DESCRIPTION OF THE DRAWINGS

Other aspects, features and advantages of the teachings of the invention will become clearer to those ordinary skilled in the art upon review of the following description in conjunction with the accompanying drawings where.

DETAILED DESCRIPTION

Figure 1:
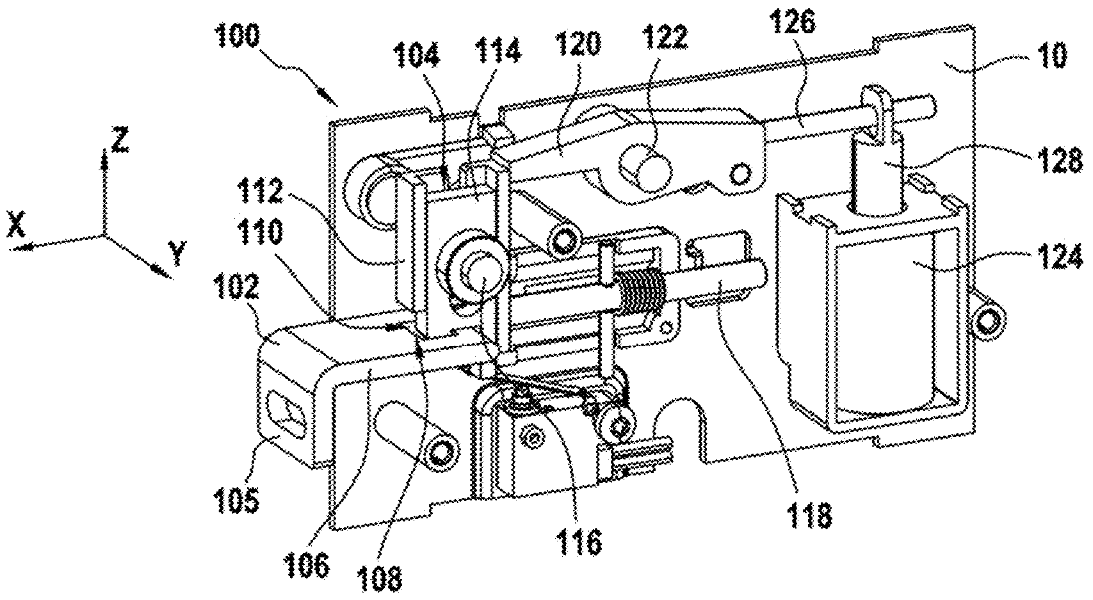
FIG. 1 is a perspective view of an embodiment of a locking system of the invention with the latch in a locking position and with a door closed.

FIG. 1 is a perspective view of an embodiment of a locking system of the invention with a latch in a locking position and a door closed. The locking system 100 is designed for securely maintaining a door in a closed position for closing a compartment of a parcel locker bank, and for automatically opening the door in response to an electric control signal. Another object of the invention is to allow closing and locking the compartment by simply pushing back the door in the closed position whatever the position of the latch of the locking system 100. Such a locking system is particularly suitable for securing the access to a compartment of a parcel locker bank.

The locking system 100 illustrated in FIG. 1 includes a locking element 102 and a latch 104. The latch 104 is fixed on a support panel 10, the support panel being designed to be mounted on a wall of the compartment, inside the compartment, while the locking element 102 is fixed onto the door of the compartment in a position to cooperate with the latch 104 when the door is closed, so the latch 104 can maintain the door of the compartment locked in a closed position. In an alternative embodiment, the locking element 102 could be mounted on a wall of the compartment, inside the compartment, while the latch 104 is attached to the door. In the embodiment illustrated on FIG. 1, the locking element 102 comprises an attachment portion 105 extending parallel to an internal surface of the door and a protruding portion 106 extending from the attachment portion perpendicularly to an internal surface of the door and comprising a holding shape 108 in which an element of the latch 104 can penetrate to hold the door closed and locked. In other words, the protruding portion 106 has a length extending mainly along a first direction x from the attachment portion 105 towards the latch 104, a width extending along a second direction y which is perpendicular to the first direction x, and a thickness extending along a third direction z which is perpendicularly to both the first direction x and the second direction y. Thus, the attachment portion 105 extends mainly along the third direction z. The holding shape 108 includes an aperture 110 which goes through the protruding portion 106 along the third direction z. The aperture 110 is located towards a distal end of the protruding portion 106, i.e., away from the attachment portion 105.

When the latch 104 is in a locking position, it has a component which penetrates through the aperture 110 to lock itself with the protruding portion 106. The holding shape 108 can be a cavity in the protruding portion 106 of the locking element 102 or an aperture 110 through the protruding portion 106 of the locking element (as illustrated on FIG. 1). The protruding portion can for example be a bar bent into an L shape (as illustrated on FIG. 1) or a U shape. As illustrated on FIG. 1, the latch 104 includes a guiding rail 112, a slider 114 and a latch pivot 116, and the locking system 100 is equipped with a push rod 118.

The slider 114 slides relatively to the guiding rail 112 along a translation direction and is guided by the guiding rail 112 into a translation. The translation direction is parallel to the third direction z when the latch is in its locking position. In a plane perpendicular to the translation direction, the section of the guiding rail 112 is a flat U shape with three primary volumes corresponding to two opposite sides and a large base extending between the two opposite sides, the two opposite sides extending along the translation direction. The thickness of the two opposite sides, measured along the second direction y, is bigger than the thickness of the base, allowing the slider 114 to be held between the two opposite sides while resting against the base. In other words, the two opposite sides restrain the slider 114 from moving along the first direction x and guide it to translate along the translation direction, and the base restrains the slider 114 at least partially from moving along the second direction y. These three primary volumes are preferably designed as a single element, but they can also be fixedly assembled together.

When the latch 104 is in a locking position, the direction of the translation is substantially perpendicular to the aperture 110 of the holding shape 108.

The latch pivot 116 defines a rotation axis extending along the second direction y around which the guiding rail 112 and the latch 104 can rotate around the latch pivot 116.

The push rod 118 extends in a direction parallel to the first direction x, and can be translated along the first direction. The push rod 118 pushes against the protruding portion 106 of the locking element to automatically open the door when the latch 104 is released.

The latch 104 includes a retaining pawl 120 and an actuator.

The retaining pawl 120 maintains the latch 104 in the locking position to prevent it from rotating around the latch pivot 116 and from releasing the locking element 102. In FIG. 1, the retaining pawl 120 is in a retaining position and holds the latch 104 in its locking position. The retaining pawl 120 comprises a pivot axle 122 extending along a direction parallel to the second direction y and around which it can rotate.

The actuator 124 can move the retaining pawl 120 from its retaining position to a releasing position allowing the latch 104 to move into an unlocking position, i.e., allowing the latch 104 to rotate into the unlocking position as the locking element 102 is being released.

The latch 104 includes a lever 126 and a drive element 128. The retaining pawl 120 is extended by the lever 126 which is coupled to the drive element 128.

The actuator 124 is an electromagnet which can pull the drive element 128 and rotate the retaining pawl 120 around the pivot axle 122 to reposition the retaining pawl 120 from the retaining position to the releasing position.

Figure 2:
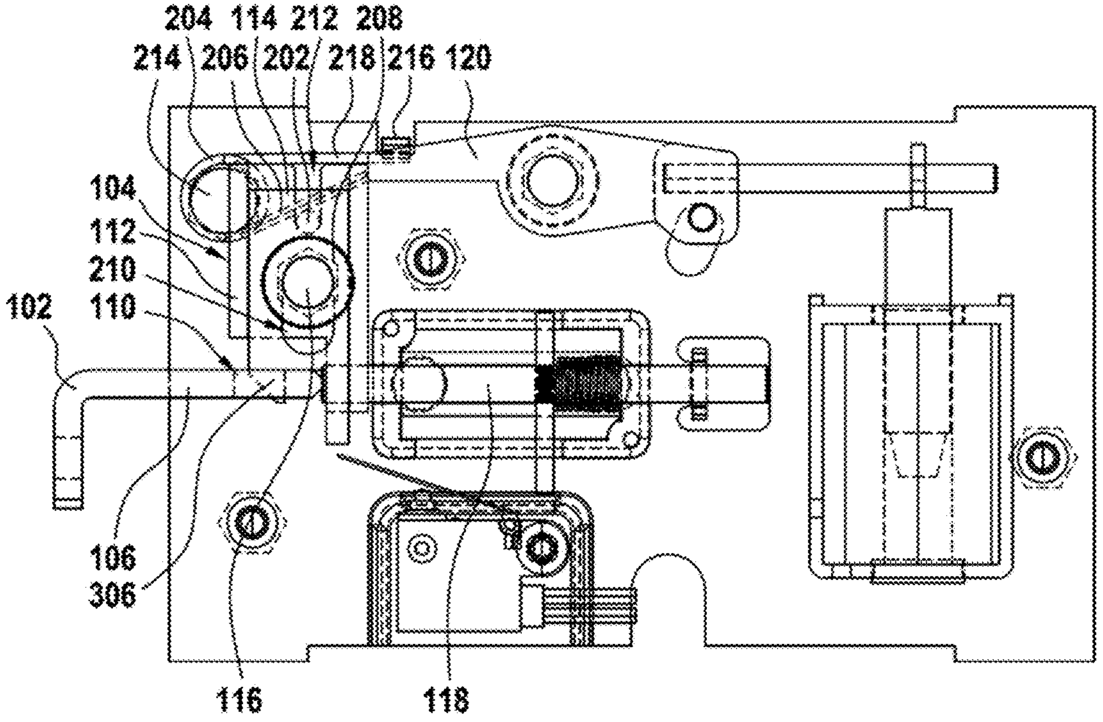
FIG. 2 is a section view of FIG. 1.

FIG. 2 is a section view of FIG. 1 which illustrates in more details the locking system according to the invention with the latch 104 in the locking position with the door closed, typically after an authorized user has closed the door by pushing it closed.

The locking element 102 is held in a closed position by the latch 104 of the locking system 100. The latch 104 is in a locking position and with a part of the slider 114 passing through the aperture 110 of the protruding portion 106 of the locking element 102.

The retaining pawl 120, while in the retaining position, maintains the latch 104 in the locking position. The latch 104 is blocked in the locking position with the door closed, preventing access to the compartment.

The slider 114 includes a spring stopper 202 designed for maintaining the slider 114 in an engaged position relatively to the guiding rail 112. The spring stopper 202 is a protuberance extending along the second direction y, preferably with a circular cylindrical shape, attached to or part of the slider 114 and extending from a side of the slider 114 facing the base of the guide rail or guiding rail 112.

The latch 104 further includes a torsion spring 204 which pushes, with a first leg 206, onto the spring stopper 202 of the slider 114 so that the slider 114 is pushed towards the locking element 102 and held in the engaged position. Preferably, the torsion spring 204 is a helical torsion spring.

To open the door when the latch 104 is released, the push rod 118 pushes against the protruding portion 106 of the locking element 102 along the first direction x, what makes the guiding rail 112 and the slider 114 rotate around the latch pivot 116. The slider 114 includes a first slot 210 which extends along the translation direction and which goes through the slider 114 along the second direction y from one side of the slider 114 to the other side of the slider 114. The latch pivot 116 extends through the first slot 210 of the slider 114. Thus, the translation of the slider 114 relatively to the guiding rail 112 is limited by the latch pivot 116 and the first slot 210.

The slider 114 is held in sliding contact with the guiding rail 112 by the latch pivot 116 equipped with a maintaining element 208, such as a washer held by a nut applying a force along the second direction y towards the guiding rail 112.

In a particular embodiment, the torsion spring 204 is placed on one side of the guiding rail 112 and the slider 114 is on the other side of the guiding rail 112.

The guiding rail includes a second slot 212 extending in the same direction as the first slot 210, i.e. the translation direction, and whose elongation is substantially of a same length or longer than the elongation of the first slot measured along the translation direction. The second slot 212 is positioned so that the spring stopper 202 of the slider 114 passes through the guiding rail 112 in order to be pushed by the torsion spring 204 and so the spring stopper 202 and the slider 114 can slide relatively to the guiding rail 112.

In FIG. 2, the second slot 212 which is routed in the guiding rail 112 is opened onto an end of the guiding rail 112 along the translation direction.

The torsion spring 204 is held in position by a spring axle 214 in which the helix of the torsion spring 204 is inserted and by a mechanical stop 216 retaining a second leg 218 of the torsion spring 204 and preventing the torsion spring 204 from rotating around the spring axle 214. The torsion spring 204 remains continuously in tension between the spring stopper 202 and the mechanical stop 216.

A second function of the torsion spring 204 is to maintain the latch 104 in an unlocking position and to ensure the rotation of the latch 104 into an unlocking position as explained with the description of FIG. 3 below. Alternatively, other spring configurations ensuring the pushing or pulling of the slider 114 as well as the rotation of the latch 104 for unlocking can be devised.

Figure 3:
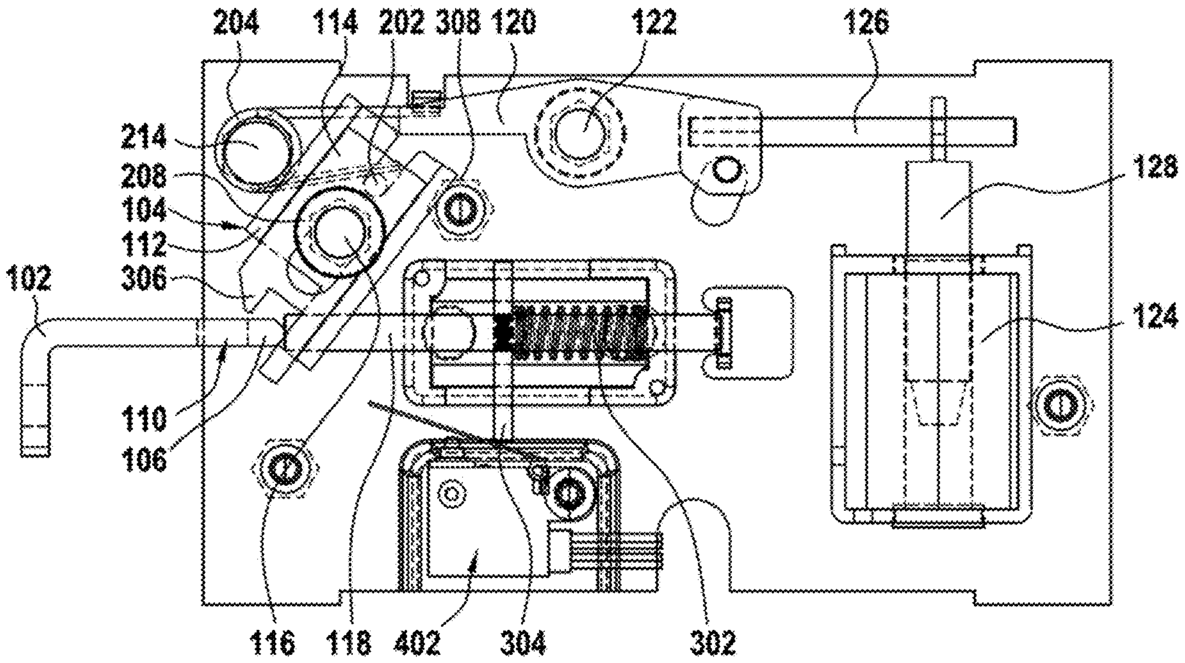
FIG. 3 illustrates an opening of a door with the locking system of the invention.

FIG. 3 illustrates an opening of the door with the locking system according to the invention, typically when an authorized user wants to access the compartment, for example when a carrier agent drops off a parcel or a letter or when a recipient picks up a parcel or a letter.

To release the latch 104, the actuator 124 pulls the drive element 128, which is coupled to the lever 126 which generates a rotation of the retaining pawl 120 around the pivot axle 122 to reposition the retaining pawl 120 from the retaining position to the releasing position. As the latch 104 is not held any more in the locking position by the retaining pawl 120, the push rod 118, pushing against the protruding portion 106 of the locking element 102 attached to the door, starts opening the door.

The pushing function of the push rod 118 is provided by a helical compression spring 302 surrounding a part of the push rod 118 and pushing on a rod stop 304 comprised in the push rod 118 or attached to the push rod 118 and whose primary extension is along the third direction, i.e., substantially perpendicular to the movement of the push rod 118. The rod stop 304 can be a bar passing through the push rod 118.

As the door is being pushed open by the push rod 118, the slider 114, and therefore the latch 104, is rotated around the latch pivot 116 from the locking position to the unlocking position.

The slider 114 comprises a mechanical tooth 306 shaped so as to penetrate and remain inserted into the aperture 110 of the locking element 102 when the latch 104 is in its locking position in order to hold the door closed and locked.

As the locking element 102 is being pushed away by the push rod 118, the holding shape 108 pushes on the tooth 306 resulting in the rotation of the latch 104. In parallel, the torsion spring 204 pushes onto the spring stopper 202 and participates in the rotation of the latch 104. The torsion spring 204 continuously pushes onto the spring stopper 202 and therefore ensures that the slider 114 is maintained in the engaged position and that the latch 104, once unlocked, remains in the unlocking position as long as the door is not closed. The rotation of the latch 104, under the pressure of the torsion spring 204, is limited by a latch stop 308.

Once the latch 104 is in its unlocking position, the retaining pawl 120 is returned to its retaining position. Spring means (not represented) are preferably provided and constantly push the retaining pawl 120 into its retaining position automatically. These spring means may co-operate directly with the retaining pawl. By preference, however, the spring means co-operate with the linearly displaceable drive element 128. In particular, the spring means, which are preferably a helical spring surrounding the drive element 128, continuously pushes against the lever 126. The retaining pawl 120 is constantly pushed into the retaining position, being spring biased by the spring means. When momentarily activated for unlocking the latch 104, the actuator 124 strength surpasses the spring means strength and displaces the retaining pawl 120 into the releasing position. After the momentarily activation of the actuator 124 and the unlocking of the latch 104, the spring means include a return spring for the lever 126 and automatically returns the retaining pawl 120 into the retaining position.

Figure 4:
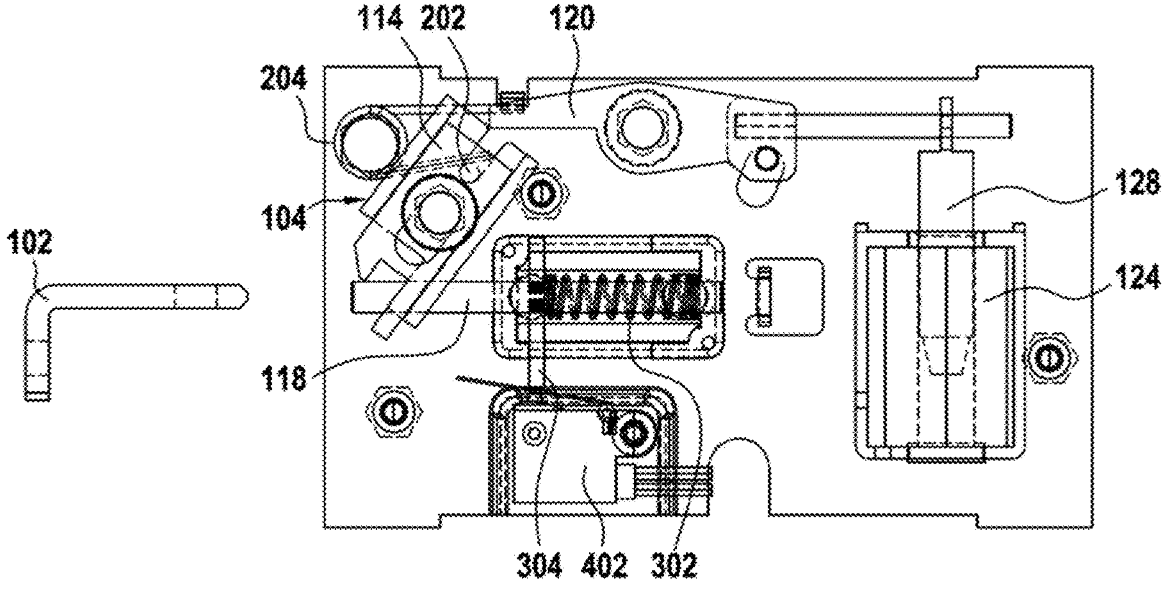
FIG. 4 illustrates the locking system of the invention once the door is opened.

FIG. 4 illustrates the locking system of the invention once the door is opened, typically when an authorized user has access to the compartment, for example for dispatching or picking up a parcel.

The locking element 102 stands away from the compartment and the rest of the locking system 100. The retaining pawl 120 is returned to the retaining position and maintained in the retaining position by the spring means (not represented), which constantly or continuously pushes the retaining pawl 120 into its retaining position. The push rod 118 pushed by the helical compression spring 302 is fully displaced in the direction of the entrance of the compartment and is in an opened door position. The rod stop 304 is designed to spatially extend so as to activate a door sensor 402 when the push rod 118 is in the opened door position. Preferably, the door sensor 402 is an electrical limit switch providing two types of signals: a first signal when the limit switch is activated by the rod stop 304 when the push rod 118 is fully displaced into the opened door position, and a second signal otherwise when the limit switch is not activated by the rod stop 304 and in particular when the push rod 118 is pushed back into a closed door position once the door has been closed by an authorized user by pushing the door closed. The torsion spring 204 continuously pushes onto the spring stopper 202 and maintains the slider 114 in the engaged position and maintains the latch 104 in the unlocking position.

Figure 5:
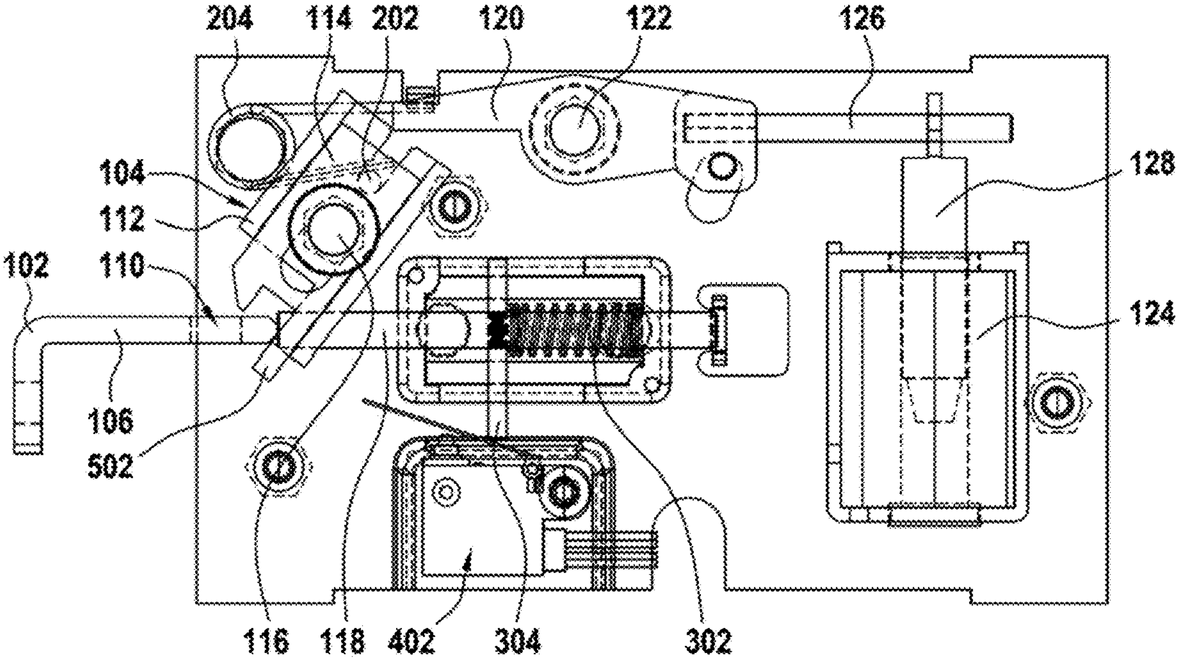
FIG. 5 illustrates the locking system of the invention with a latch unlocked and the door in the process of being pushed closed.

FIG. 5 illustrates the locking system of the invention with the latch unlocked and the door in the process of being pushed closed. After having had access to compartment, a user closes the door by pushing it closed, for example after having dropped off or picked up a parcel.

As the door is being pushed closed, the locking element 102 pushes both onto the push rod 118 and a latch leg 502. The latch leg 502 is a protrusion of the latch 104, which extends in the path of the protruding portion 106 of the locking element 102. In the embodiment illustrated on FIGS. 1 to 5, the latch leg 502 is a protrusion of the slider 114 along the translation direction.

As the push rod 118 is being pushed by the locking element 102, the helical compression spring 302 is compressed by the rod stop 304 and the rod stop 304 eventually de-activates the door sensor 402. As the latch leg 502 is being pushed by the locking element 102, the slider 114 and the guiding rail 112 rotate around the latch pivot 116 and the torsion spring 204 is compressed further by the spring stopper 202. Eventually, as the latch 104 continues to rotate, the guiding rail 112 and the slider 114 start pushing onto the retaining pawl 120, which then rotates around the pivot axle 122 driving with the lever 126 to push down onto the drive element 128 compressing the spring means (not represented), which co-operate with the linearly displaceable drive element 128. Finally, as the user finishes closing the door, the latch 104 is pushed back in the locking position and the retaining pawl 120 returns to the retaining position as the spring means acting as a return spring for the lever 126 automatically return the retaining pawl 120 into the retaining position. The door and the locking element 102 are held locked in the closed position by the latch 104. The tooth 306 of the slider 114 penetrating the aperture 110 of the locking element 102, maintains the locking element 102 in the closed position while the push rod 118 pushes against the protruding portion 106 of the locking element 102. The retaining pawl 120 maintains the latch 104 in the locking position. The torsion spring 204 pushing on the spring stopper 202 holds the slider 114 in the engaged position. Resulting from the closing of the door, the locking system 100 of the invention is back in the configuration illustrated by FIG. 1, where the latch is repositioned in the locking position and is maintained in the locking position with the door closed.

FIGS. 1 to 5 illustrate two normal states of the locking system 100 of the invention: a secured state with the door closed and latch 104 in the locking position (FIG. 1 or 2), and an access state with the latch 104 in the unlocking position (FIG. 2 or 3 or 4) and the door opened or in the process of opening or in the process of being closed.

Figure 6:
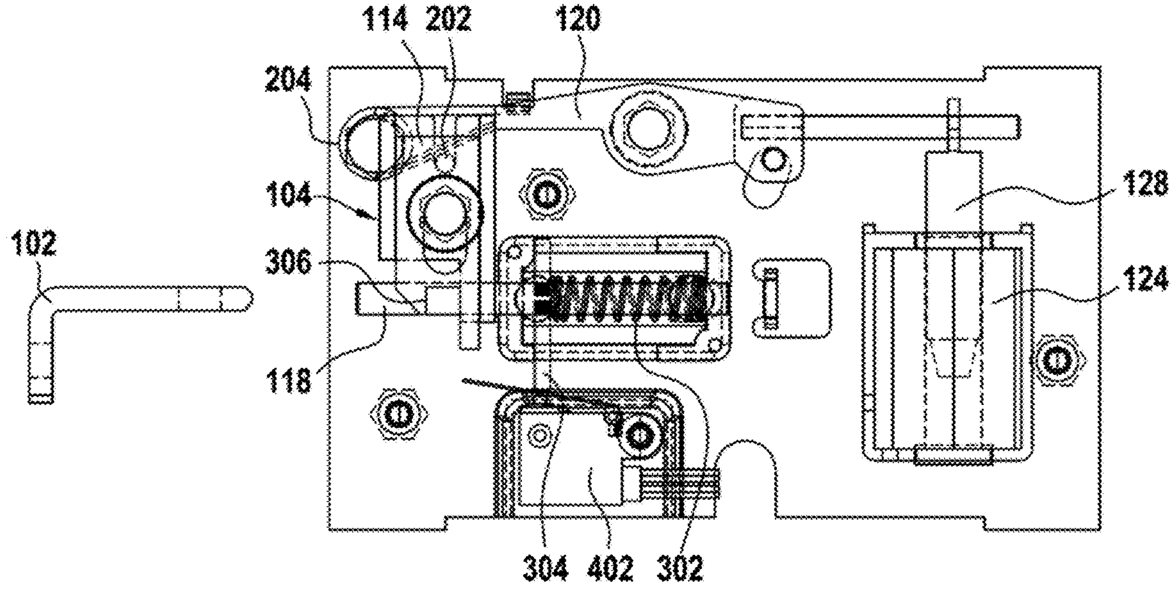
FIG. 6 illustrates the locking system of the invention in an abnormal state with the door opened and the latch in the locking position.

FIG. 6 illustrates the locking system of the invention in an abnormal state with the door opened and the latch in the locking position. Such an abnormal state may occur due to a mishandling or a malicious action, while the door of a compartment is opened, resulting in the latch 104 being repositioned in the locking position and blocked in the locking position by the spring biased retaining pawl 120. The locking element 102 stands away from the compartment and from the rest pf the locking system 100. The retaining pawl 120 is in the retaining position and is maintained in the retaining position by the spring means (not represented). The retaining pawl 120 maintains the latch 104 in the locking position. The torsion spring 204 continuously pushes onto the spring stopper 202 and maintains the slider 114 in the engaged position. The push rod 118 pushed by a helical compression spring 302 is fully displaced in the direction of the entrance of the compartment and is in the opened door position. The rod stop 304 activates the door sensor 402, which provides the first signal corresponding to the opened door position.

As illustrated on FIG. 6, when the latch in the locking position, the tooth 306 lies in the path of the locking element 102. However, the locking system 100 according to the invention still allows closing and locking the door despite the abnormal state.

It must be noticed that the design of the locking system of the invention allows for a simple return to a normal state with the door opened and the latch in the unlocking position.

The actuator 124 can be activated by an electric control signal, generated for example by a controller of the parcel locker bank, thereby displacing the retaining pawl 120 from the retaining position to a releasing position and freeing the latch 104. The torsion spring 204 pushes onto the spring stopper 202 and rotates the latch 104 into the unlocking position. The torsion spring 204, in addition to maintaining the slider 114 in the engaged position, allows the locking system to return from an abnormal state to the normal state with the door opened and the latch in the unlocking position.

Figure 7:
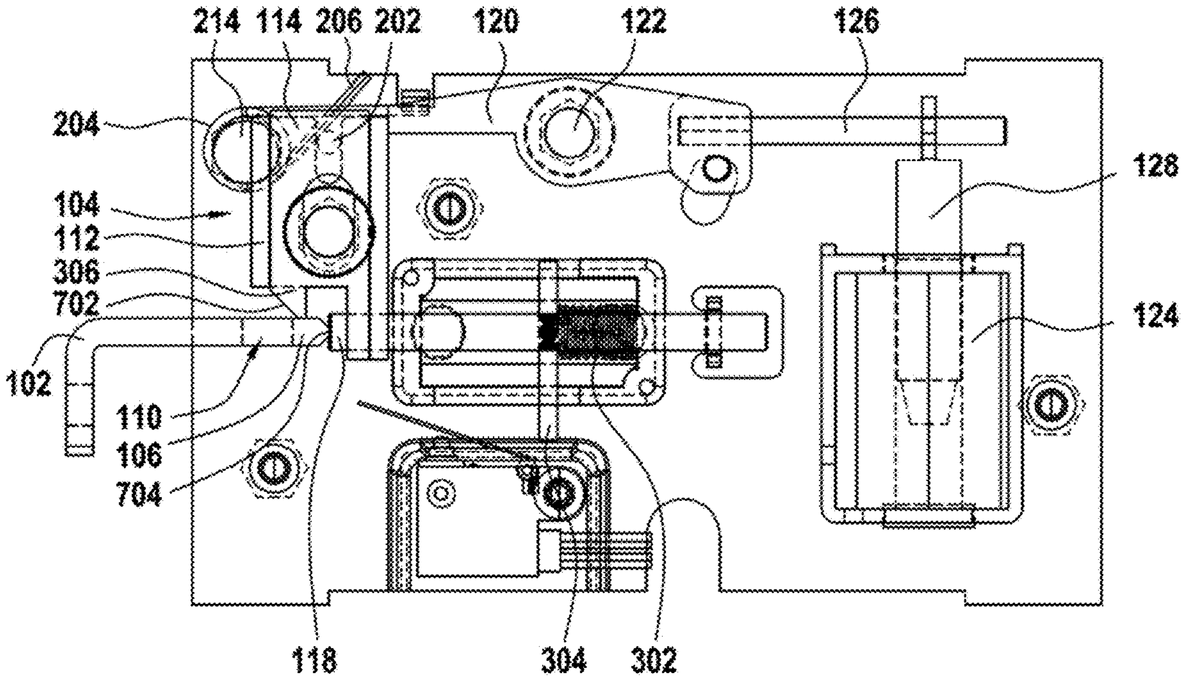
FIG. 7 illustrates how the locking system of allows closing and locking the door although it was in the abnormal state of FIG. 6.

FIG. 7 illustrates how the locking system of the invention, although being in an abnormal state with the door opened and the latch in the locking position, allows closing and locking the door.

When a user pushed the door closed, the locking element 102 begins to push on the push rod 118 and hits the tooth 306 of the slider 114. As the slider 114 is being pushed by the protruding portion 106 of the locking element 102, the slider 114 slides away from the engaged position along the third direction z towards a disengaged position. The tooth 306 includes a contacting surface 702 facing the protruding portion 106 of the locking element 102. The contacting surface 702 is a shaved surface so that the contacting surface 702 has an orientation of substantially 45 degrees with a plane in which the locking element 102 moves when the door is being closed. The orientation of the contacting surface 702 facilitates a transfer of a pushing force of the locking element 102 into a substantially perpendicular sliding force allowing for the slider 114 to slide along the guiding rail 112.

The protruding portion 106 has along the first direction a front end 704 which faces the contacting surface 702 of the tooth 306 and which is substantially a cylindrical surface with a base, which is substantially triangular or substantially semicircular, and whose generatrix axis is substantially perpendicular to the plane in which the locking element moves when the door is being closed, i.e. extends along the second direction y, so that the front end 704 facilitates further the transfer of the pushing force of the locking element 102 into the substantially perpendicular sliding force allowing the slider 114 to slide along the guiding rail 112.

As the slider slides away from the engaged position, the torsion spring 204 is compressed further by the spring stopper 202 and the protruding portion 106 of the locking element 102 slides under the slider 114, eventually slipping under the tooth 306.

FIG. 7 illustrates the disengaged position of the slider 114, when the protruding portion 106 of the locking element 102 has slid under the tooth 306 of the slider 114. As the door continues to be pushed closed by a user, the locking element 102 keeps on pushing onto the push rod 118, the helical compression spring 302 is compressed by the rod stop 304 and the rod stop 304 eventually de-activates the door sensor 402.

As the user ends up closing the door, the aperture 110 of the locking element 102 arrives below the tooth 306 of the slider 114, the torsion spring 204, pushing on the spring stopper 202 with a first leg 206 of the torsion spring 204, pushes the slider 114 towards the locking element 102, and the tooth 306 of the slider 114 penetrates the aperture 110 of the locking element 102. At the end, the tooth 306 maintains the locking element 102 in the closed position while the push rod 118 pushes against the protruding portion 106 of the locking element 102. The retaining pawl 120 maintains the latch 104 in the locking position. The torsion spring 204 pushing on the spring stopper 202 holds the slider 114 in the engaged position. Hence, the locking system 100 according to the invention is back in the configuration illustrated by FIG. 1, where the latch 104 is repositioned in the locking position and is maintained in the locking position with the door closed.

The locking system 100 according to the invention allows closing and locking the door despite being in an abnormal state with the door opened and the latch in the locking position. This capability prevents the need for two separate sensors, which would be required to detect and correct this abnormal state. This way, with a locking system according to the invention, only one door sensor is needed, this sensor being used only to detect if the door is opened or closed.

A most beneficial embodiment of the locking system of the invention is that the single torsion spring 204 provides both the function of sliding the slider 114 into the engaged position and eventually maintaining the slider 114 in the engaged position and the function of rotating the latch 104 from the locking position to the unlocking position and eventually maintaining the latch 104 in the unlocking position.

The torsion spring 204 has got dimensions and features allowing it to overcome the sliding frictions of the slider 114 and the rotation frictions for rotating the latch 104. The arrangement of the mechanical elements of the locking system 100, and in particular the arrangement of the spring axle 214 and the spring stopper 202 is set appropriately to allow the torsion spring 204 to overcome the sliding frictions of the slider 114 and the rotation frictions for rotating the latch 104. Usually, the sliding frictions are more important than the rotation frictions and sliding frictions constraint are handled primarily by the design of the locking system.

Figure 8:
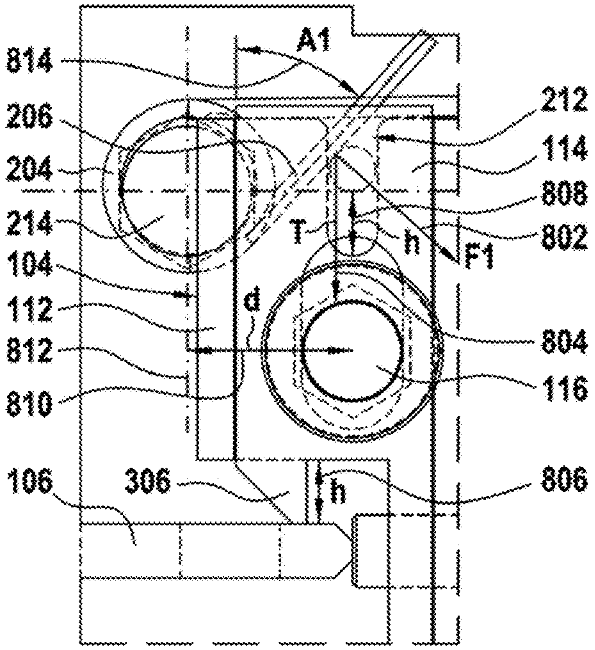
FIG. 8 is a zoom on an action of a torsion spring when the locking system of the invention in an abnormal state.

FIG. 8 illustrates an action of the torsion spring 204 when the locking system 100 according to the invention is in an abnormal state with the door opened and the latch 104 in the locking position, and the slider 114 is in the disengaged position. This corresponds to the locking system configuration where the sliding frictions of the slider are the most important. In the situation illustrated in FIG. 8, a user is about to finish closing the door, and the protruding portion 106 of the locking element 102 has slipped under the tooth 306 of the slider 114 and has pushed the slider 114 away from the engaged position to the disengaged position. The first leg 206 of the torsion spring 204 exerts a pushing force (F1) 802 on the spring stopper 202. This pushing force 802 is exerted on a zone of contact between the first leg 206 and the spring stopper 202 and is perpendicular to both an axis of the first leg 206 and an axis of the spring stopper 202. A first vector component of the pushing force (F1) is a translation force (T) 804, which is parallel to the translation direction of the slider 114.

As the user finishes closing the door, the translation force component (T) pushes the slider 114 towards the locking element 102 so that the tooth 306 of the slider 114 can penetrate the aperture 110 of the holding shape 108 of the locking element 102. A second vector component of the pushing force (F1), which is perpendicular to the translation force (T), participates in the sliding frictions of the slider 114. The arrangement of the mechanical elements of the locking system 100, and in particular of the spring axle 214 and the spring stopper 202 ensures that the translation force (T) can overcome the sliding frictions of the slider 114.

In a preferred embodiment, the spring stopper 202 is positioned relatively to the spring axle 214 so that, when the slider 114 is in the disengaged position and the latch 104 is in the locking position, a first angle (A1) 814 formed between the translation direction of the slider 114 and the axis of the first leg 206, corresponding to a direction of the translation force (T), is substantially equal or larger than 45 degrees.

The tooth height (h) 806 corresponding to the height of the tooth 306 is selected to safely secure the latch 104 in the locking position and to hold the door closed and locked when the slider 114 is in the engaged position. For electrical locks of parcel locker banks, the tooth height (h) is between 3 and 5 millimeters, and preferably is equal to 3.5 millimeters. The tooth height 806 value h corresponds to the slider translation 808 value h between the engaged position to the disengaged position when the spring stopper 202 slides within the second slot 212 in the guiding rail 112. A central axis of the latch pivot 116 is positioned at a distance (d) 810 from a reference axis 812 which passes through a central axis of the spring axle 214 and is parallel to the translation direction of the slider. The distance 810 (*d*) must be long enough for lowering the first angle 814 (A1) between the translation direction of the slider 114 and the axis of the first leg 206, therefore minimizing the sliding frictions of the slider 114 and allowing the translation force (T) to overcome the sliding frictions. For electrical locks of parcel locker banks, the value d of the distance 810 is between 6 and 17 millimeters, and preferably is equal to 9.1 millimeters.

Figure 9:
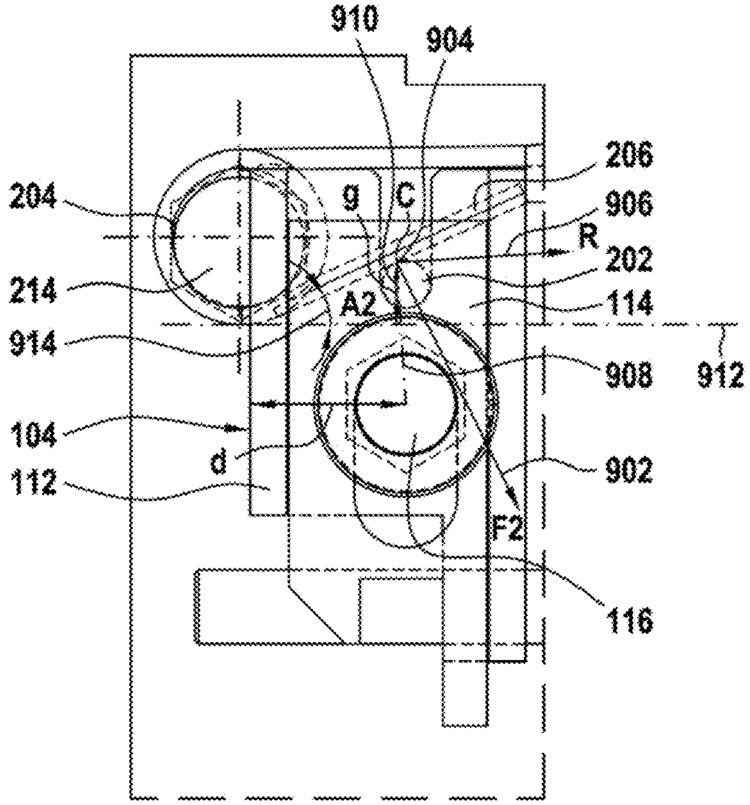
FIG. 9 is a zoom of an action of the torsion spring for the latch to rotate from the locking position to an unlocking position.

FIG. 9 illustrates an action of the torsion spring 204 for the latch 104 to rotate from the locking position to the unlocking position. Such an action is typically required when the locking system 100 according to the invention is in an abnormal state with the door opened and the latch in the locking position, and where the torsion spring 204 can allow the locking system 100 to return to the normal state with the door opened and the latch in the unlocking position after releasing the latch 104 by actuating the retaining pawl 120. The first leg 206 of the torsion spring 204 exerts a pushing force (F2) 902 on the spring stopper 202. This force is exerted on a zone of contact (C) 904 between the first leg 206 of the torsion spring 204 and the spring stopper 202 of the slider 114 and is perpendicular to both an axis of the first leg 206 and an axis of the spring stopper 202. A first vector component of the pushing force (F2) is a rotation force (R) 906, which is perpendicular to an axis 908 passing through the zone of contact and the axis of the latch pivot 116, wherein the axis 908 is perpendicular to the latch pivot 116. The rotation force (R) 906 acts on the spring stopper 202 and on the slider 114 for rotating the latch 104 from the locking position to the unlocking position. However, the rotation force (R) 906 overcomes the rotation frictions of the latch 104 on the latch pivot 116. The pushing force (F2) participates in the rotation frictions. Lowering an angle between the axis of the first leg 206 and the translation direction of the slider 114 results in increasing the rotation force (R), which is the first vector component of the pushing force (F2), and in decreasing the participation of the pushing force (F2) in the rotation frictions, therefore facilitating the rotation of the latch 104. The arrangement of the mechanical elements of the locking system 100, and in particular of the spring axle 214 and the spring stopper 202 ensures that the rotation force (R) overcomes the rotation frictions.

In a preferred embodiment, the spring stopper 202 is positioned relatively to the spring axle 214 so that, when the slider 114 is in the engaged position and the latch is in the locking position, a second angle (A2) 914 between the axis of the first leg 206 and a direction perpendicular to the translation direction of the slider 114 is larger than 20 degrees, and preferably is equal to 24.8 degrees.

An elevation of the first leg 206, corresponding to the second angle (A2), can also be measured by a gap (g) 910 equal to a distance between the zone of contact (C) and a spring lower axis 912, which is perpendicular to the translation direction of the slider 114 and is tangent to an outer part of the torsion spring 204 from which the first leg 206 originates. The gap 910 (*g*) is wide enough to increase the first vector component of the pushing force (F2) corresponding to the rotation force (R) so that the rotation force 906 (R) overcomes the rotation frictions of the latch 104 on the latch pivot 116. For electrical locks of parcel locker banks, the gap 910 has a value g preferably between 3 and 7 millimeters, and preferably equal to 3.5 millimeters. Then, the preferred embodiment referring to FIG. 9 stating that the second angle (A2) between the axis of the first leg 206 and a direction perpendicular to the translation direction of the slider 114 is larger than 20 degrees substantially corresponds to a first inequality:

$$d \leq g/0.36 \tag{1}$$

where 0.36 is approximatively the value of tangent (20°).

In reference to the FIG. 8, when the first angle (A1) between the direction of the translation force (T) and the axis of the first leg 206 equals 45 degrees, the distance (d) equals the sum of the gap (g) and the tooth height (h). Therefore, the above preferred embodiment referring to FIG. 8 stating that the first angle (A1) between the direction of the translation force (T) and the axis of the first leg 206 is substantially equal or larger than 45 degrees corresponds to a second inequality:

$$d \geq g + h \tag{2}$$

The combination of the first and second inequalities (1) and (2) results in the following double inequality defining a preferred range for the distance (d) in reference to the gap (g) and the tooth height (h) of the slider:

$$g + h \leq d \leq g/0.36 \tag{3}$$

The invention provides a new locking system for a door of a compartment of a parcel locker bank designed for automatically opening a door to which the door lock device is coupled in response to an electric control signal, the new locking system being designed so it can still be closed even when the latch is already in its locking position while the door is not yet closed.

The invention claimed is:

1. A locking system for a door of a compartment of a parcel locker bank designed for automatically opening a door to which a door lock device is coupled in response to an electric control signal, the locking system comprising a locking element and a latch, the locking element being designed to be mounted to a door of a compartment while the latch is designed to be mounted to a wall of said compartment, the locking element comprising a protruding portion extending in a first direction, the latch comprising a latch pivot around which the latch rotates between a locking position in which the latch can lock onto the protruding portion of the locking element when the latch and the locking element are in contact together and an unlocking position in which the protruding portion is released from the latch to open the door, the latch pivot having an axis of rotation extending along a second direction perpendicular to the first direction, wherein the latch further comprises a slider and a guiding rail configured to guide the slider along a translation direction, said translation direction being parallel to a third direction perpendicular to both the first direction and the second direction when the latch is in the locking position and different from the third direction when the latch is in the unlocking position.

2. The locking system according to claim 1, wherein the protruding portion of the locking element comprises an aperture passing through the protruding portion along the third direction, and the slider comprises, along the translation direction, a first end facing the protruding portion when the latch is in contact with the locking element, a second end opposite the first end, and a tooth extending outwardly from said first end along the translation direction, the tooth being shaped to engage with the protruding portion and remain into said aperture when the latch is in the locking position.

3. The locking system according to claim 2, wherein the tooth comprises a contacting surface facing towards the locking element and forming an angle between 30° and 60° with the translation direction.

4. The locking system according to claim 3, wherein the protruding portion of the locking element comprises, along the first direction, a front end facing the contacting surface of the tooth, the front end having substantially a cylindrical surface extending along the second direction with a base being substantially triangular or substantially semi-circular.

5. The locking system according to claim 1, wherein the latch comprises a latch leg always crossing the first direction along which the protruding portion extends whatever position the latch is in, said protruding portion being configured to push onto the latch leg.

6. The locking system according to claim 5, wherein the latch leg is a protrusion of the slider extending from its first end.

7. The locking system according claim 1, further comprising a torsion spring with a first leg configured to push the slider towards the locking element and hold it engaged with the locking element when the latch is in the locking position, and to rotate and maintain the latch into the unlocking position otherwise.

8. The locking system according to claim 7, wherein the slider comprises a first slot extending along the translation direction and through which the latch pivot extends, thus limiting a translation movement of the slider relatively to the guiding rail.

9. The locking system according to claim 7, wherein the slider includes a spring stopper extending from the slider in a direction parallel to the second direction, the first leg of the torsion spring pushing constantly against the spring stopper at least partially along the third direction to hold the slider down when the latch is in the locking position.

10. The locking system according to claim 9, wherein, along the second direction, the torsion spring is on one side of the guiding rail and the slider is on an other side of the guiding rail, the spring stopper passing through the guiding rail, and the guiding rail comprising, along the translation direction, a first guiding end facing the locking element and a second guiding end opposite the first guiding end, the guiding rail further comprising a second slot extending along the translation direction and opening on the second guiding end of the guiding rail, the spring stopper being in sliding relation along the translation direction in the second slot.

11. The locking system according to claim 1, wherein a section of the guiding rail along a cutting plane perpendicular to the translation direction has a flat U shape comprising two opposite sides and a base extending between the two opposite sides, the slider having a translation movement parallel to the two opposite sides.

12. The locking system according to claim 11, further comprising a retaining pawl and a drive element, the retaining pawl being configured to block the latch in the locking position to prevent it from rotating and releasing the locking element, and comprising a pivot axle around which it rotates, and the drive element being mechanically coupled to the retaining pawl and being configured to rotate the retaining pawl around the pivot axle to reposition the retaining pawl from the retaining position to the releasing position.

13. The locking system according to claim 1, further comprising a push rod configured to push against the protruding portion for the door to automatically open when the latch is moved from its locking position to its unlocking position.

14. The locking system according to claim 13, further comprising a door sensor and a helical compression spring, said helical compression spring surrounding a part of the push rod and configured to push on a rod stop comprised in the push rod or attached to the push rod and extending substantially perpendicularly to a direction of a movement of the push rod, and said door sensor being activated by the rod stop when the push rod extends in an opened door position.

15. A method closing and locking a door of a compartment of a parcel locker bank, said compartment being mounted with a locking system according to claim 1 and thus comprising a locking element attached to said door and a latch attached to a wall of said compartment, the latch comprising a slider and a guiding rail, and the method including:

- a first act in which the door is opened and the latch in a locking position,
- a second act in which the door is pushed back by a user towards a closed position,
- a third act in which the slider is pushed up the guiding rail by the locking element from an engaged position towards a disengaged position,
- a fourth act in which, once the door has been completely pushed back to a closed position, the slider gets back to and engaged position and locks in with the locking element to maintain door locked.

16. The locking system according to claim 3, wherein the contacting surface forms an angle of 45° with the translation direction.

* * * * *